United States Patent [19]

Otani

[11] Patent Number: 4,686,484

[45] Date of Patent: Aug. 11, 1987

[54] PHASE DETECTION CIRCUIT

[75] Inventor: Susumu Otani, Tokyo, Japan

[73] Assignee: NEC Corporation, Japan

[21] Appl. No.: 850,747

[22] Filed: Apr. 11, 1986

[30] Foreign Application Priority Data

Apr. 17, 1985 [JP] Japan .................................. 60-81932

[51] Int. Cl.$^4$ .............................................. H04L 7/06
[52] U.S. Cl. .................................... 329/109; 329/110;
329/137; 375/94; 328/155
[58] Field of Search ............... 329/104, 109, 110, 122,
329/137; 375/24, 52, 67, 41, 94; 455/102, 108,
110; 328/133, 134, 155; 307/511, 516

[56] References Cited

U.S. PATENT DOCUMENTS 4,286,223 8/1981 Shearer ........................... 329/104 X
4,504,960 3/1985 Yamada .......................... 329/104 X Primary Examiner—Eugene R. LaRoche
Assistant Examiner—Robert J. Pascal
Attorney, Agent, or Firm—Laff, Whitesel, Conte & Saret

[57] ABSTRACT

A phase detector demodulates a carrier wave which is modulated by a phase shift keying (PSK), a quadrature amplitude modulation, or a similar digital modulated wave. The detector detects the phase difference between an analog signal and a reference clock signal. The analog signal is sampled at the frequency of the clock signal and provides a first k-bit digital signal. A delay circuit samples the first digital signal at one-half of the reference signal frequency in order to produce a second k-bit digital signal. A multiplier multiplies the first and second digital signals and gives a phase difference signal.

14 Claims, 18 Drawing Figures

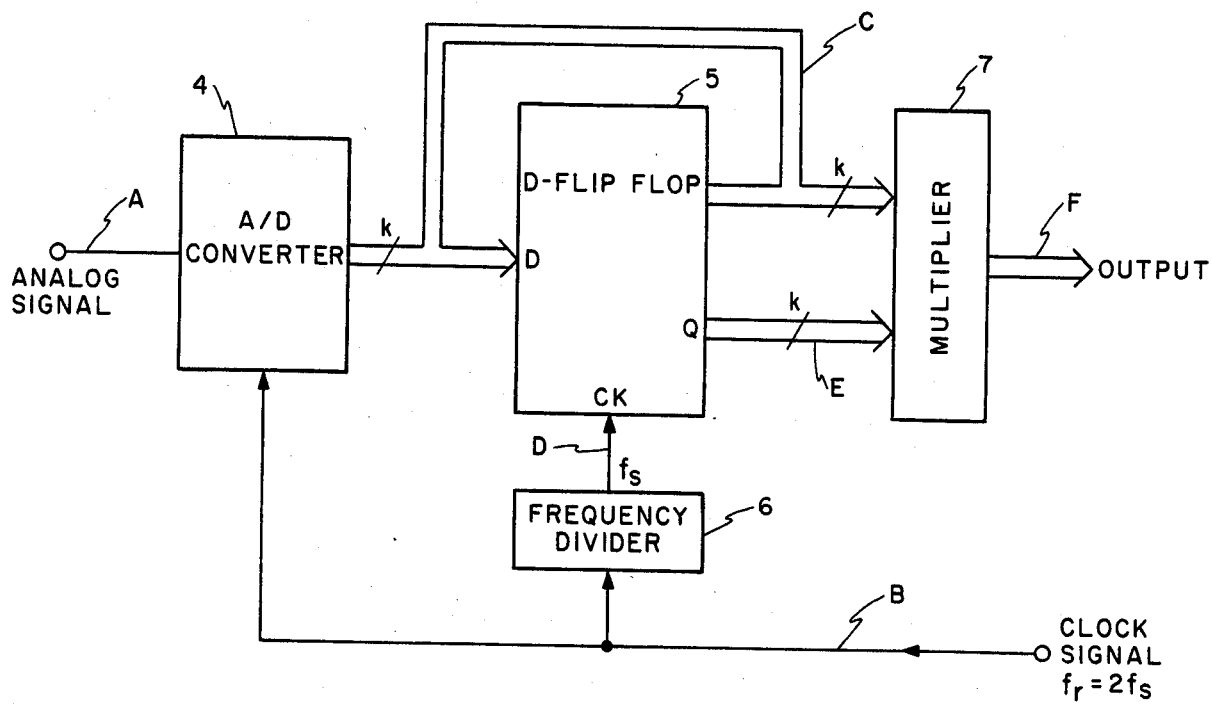
FIG. 3
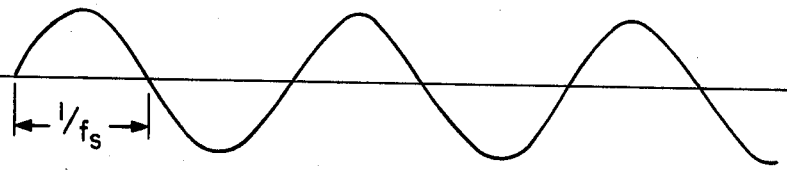
FIG. 4A
FIG. 4B
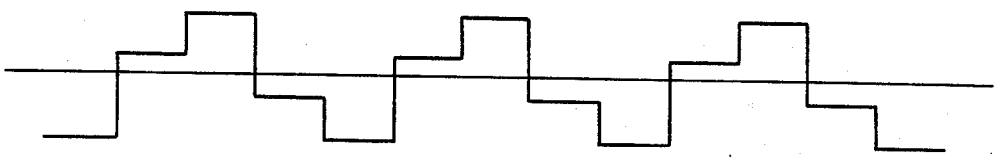
FIG. 4C
FIG. 4D
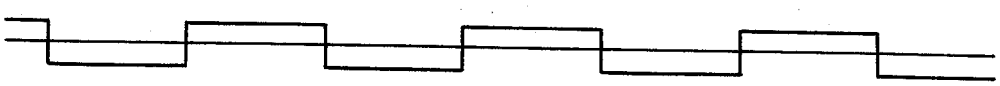
FIG. 4E
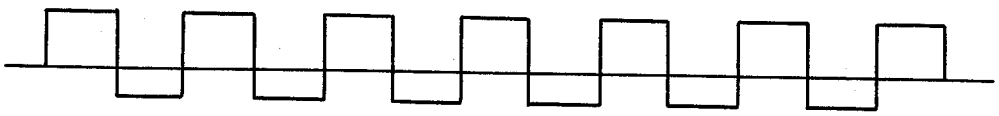
FIG. 4F

PHASE DETECTION CIRCUIT

BACKGROUND OF THE INVENTION

The present invention relates to a phase detection circuit for use with, for example, a demodulator which is adapted for demodulation of PSK (Phase Shift Keying), QAM (Quadrature Amplitude Modulation) and other digital modulated carrier waves. More particularly, the present invention is concerned with a phase detection circuit for detecting a difference between an analog signal which contains a clock signal component and a reference clock signal.

A prior art phase detection circuit of the type described is made up of a reference clock generator, a timing extracting circuit, a set-reset flip-flop (SR FF), a counter, and a high-rate clock generator. The output of the reference clock generator is coupled to a reset input of the SR FF and a reset input of the counter. The timing extracting circuit extracts a timing signal from an analog signal which contains a clock signal. The timing signal is applied to a set terminal of the SR FF. The SR FF compares the phase of the timing signal with the phase of the reference clock signal which is fed to the reset input thereof, thereby producing a pulse signal which is representative of a phase difference between the two signals. Only when the output pulse signal from the SR FF is at a high level, does the counter count up clock pulses from the high-speed clock generator to produce the phase difference as a digital value.

The above-described type of phase detection circuit is not readily practicable, however, because the accuracy of the phase difference measurement cannot be enhanced unless the high-rate clock is a value which is sufficiently greater (usually more than thirty) than the modulation rate. Therefore, a demodulator and other circuits are operable at considerably high processing rates.

SUMMARY OF THE INVENTION

It is, therefore, an object of the present invention to provide a phase detection circuit capable of operating at a processing speed which is two times higher than the modulation rate of analog signals.

A phase detection circuit, to which the present invention is applicable, detects the difference in phase between an analog signal, including clock components, and a reference clock signal. The inventive phase detection circuit comprises an analog-to-digital converter for sampling the analog signal at the frequency of the reference clock signal and for providing a k-bit first digital signal. A delay circuit means samples the first digital signal at a frequency which is equal to one-half the frequency of the reference clock signal and provides a k-bit digital signal. A multiplier means multiplies the first digital signal by the second digital signal to provide data which is representative of the phase difference.

BRIEF DESCRIPTION OF THE DRAWINGS

The above and other objects, features and advantages of the present invention will become more apparent from the following description taken with the accompanying drawings:

FIG. 3 is a block diagram showing a phase detection circuit, in accordance with the present invention;

FIGS. 4A to 4F are timing charts which are representative of the operation of the circuit shown in FIG. 3;

DESCRIPTION OF THE PREFERRED EMBODIMENTS

Figure 1:
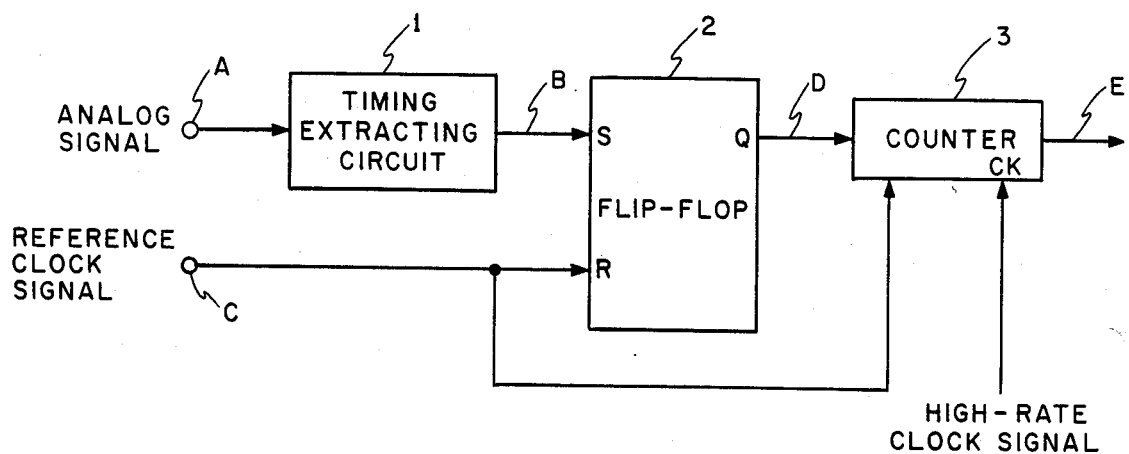
FIG. 1 is a block diagram of a prior art phase detection circuit.

To better understand the present invention, a brief reference may be made to a prior art phase detection circuit, shown in FIG. 1. The operation of the prior art circuit is shown in FIGS. 2A to 2E.

Figure 2A:
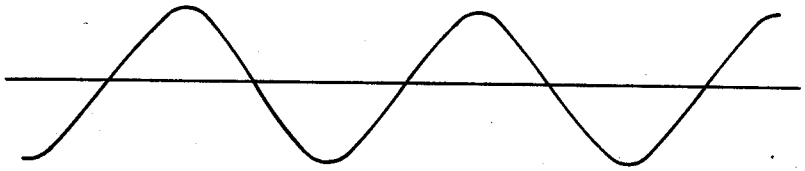
FIGS. 2A to 2E are timing charts for demonstrating the operation of the circuit of FIG. 1.
Figure 2B:
Figure 2C:
Figure 2D:

An analog signal A (FIG. 2A) is, for example, a coherent detection output of a demodulator, not shown. A timing extracting circuit 1 extracts a timing signal B (FIG. 2B) which, in this example, is a zero-crossing timing signal associated with the analog signal A. The timing signal B is applied to the set terminal of a set-reset flip-flop (SR FF) 2 which then detects a difference between the timing signal B and a reference clock signal C (FIG. 2C). Signal C is the output of a reference clock generator, not shown. As a result, the SR FF 2 produces a signal D (FIG. 2D) which is representative of the phase difference between the signals B and C.

The phase difference signal D carries phase information in each of its pulse widths. Therefore, each pulse width must be integrated to find a phase difference. So long as the demodulator is an analog processing type, the integration may be implemented with an integrator. However, when it comes to a digital processing type demodulator, digital processing must be employed for the integration. In this particular example, a counter 3 is used to effect the integration.

Figure 2E:

The counter 3 is constructed to count up only when the logical level of the signal D is a ONE. The counting is responsive to a high rate clock signal which is fed to terminal CK from a high-rate clock generator, not shown. The counter 3 is initialized (usually to zero) by the reference clock signal C. In this condition, the counter 3 produces an output E, as shown in FIG. 2E.

The high-rate clock which is adapted to drive the counter 3 must have a value (usually more than thirty) which is sufficiently higher than the modulation rate or the reference clock. Otherwise, there is a deteriorioating phase resolution performance. This, in turn, requires the processing rate of the demodulator to be increased to an impractical value.

FIG. 3 shows a phase detection circuit, embodying the present invention, which constitutes a solution to the above-discussed problem. An analog signal A, which has been modulated at a rate fs is applied to an analog-to-digital (A/D) converter 4. Also applied to the A/D converter 4 is a clock signal (fr) B having a pulse frequency rate which is two times higher than the rate of signal A, i.e. 2fs. The A/D converter 4 quantizes the analog signal A to produce a k-bits (k being a positive integer) digital signal C responsive to the clock signal B.

The digital signal C is the output of the A/D converter 4 and is sampled and delayed by a k-bit D type flip-flop (D FF) 5, at a rate fs. In this particular embodiment, the clock signal B (whose rate is 2fs) is phase-locked to a reference clock signal having a rate fs. The rate of signal B is halved by a frequency divider 6 to provide a clock signal (fs) D. This clock signal D is applied to a clock input (CK) of the D FF 5.

A multiplier 7 multiplies a delayed output E of the D FF 5 and the k-bits quantized signal C. The resultant product F is delivered as a phase difference signal. The multiplier 7 may be implemented with either a digital adder or a read only memory (ROM) storing various products of C×E, which may be addressed by the signals C and E. The D type flip-flop may be replaced by a shift register.

FIGS. 4A to 4F form a timing chart describing the signals A to F which appear in various portions of FIG. 3, as stated above. The waveform of the output C of the A/D converter 4 (FIG. 4C) is represented on a PAM (Pulse Amplitude Modulation) basis, for simplicity. Among the signals sampled by the A/D converter 4, at the rate 2fs, FIG. 4E shows the odd sampled signal, for example, which constitutes the signal E. This signal is sampled and delayed by the D FF 5, at the rate fs.

Assuming that the demodulated analog signal which is synchronous with the reference clock is d(t) = cos (πfst), the even and the odd sampled signals which were sampled by the A/D converter 4 at the rate 2fs are expressed, as follows:

$$Event\ (t) = F_{even}\ (nT + t0) \qquad \text{Eq. (1)}$$
$$= \cos\{n\pi + (\pi/T)t0\}$$

$$F_{odd}\ (t) = F_{odd}\ (nT + T/2 + t0) \qquad \text{Eq. (2)}$$
$$= \cos\{n\pi + \pi/2 + (\pi/T)t0\}$$
$$= -\sin\{n\pi + (\pi/T)t0\}$$

where: T is 1/fs, and t0 is a time gap associated with a phase difference θ between the reference clock signal and the analog signal A.

The multiplier 7 multiplies the even and the odd sampled signals $F_{even}$ (t) and $F_{odd}$ (t). Hence, based on the Eqs. (1) and (2), the output F of the multiplier 7 is produced as:

$$F = \cos\{n\pi + (\pi/T)t0\} \times (-1)\sin\{n\pi + (\pi/T)t0\} \qquad \text{Eq. (3)}$$
$$= (-\tfrac{1}{2})[\sin\{2n\pi + (2\pi/T)t0\} + \sin 0]$$
$$= (-\tfrac{1}{2})\sin\theta$$

where: θ is 2 πt0/T.

Figure 5:
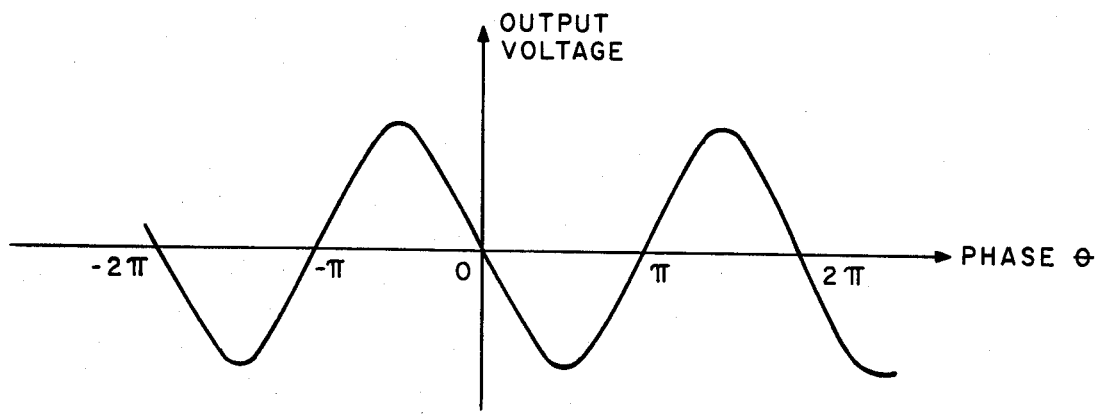
FIG. 5 is a plot showing a phase detection characteristic which is particular to the circuit of FIG. 3.

It will be apparent from the Eq. (3) that the circuitry shown in FIG. 3 is capable of determining a phase difference θ between the reference clock signal (fr) and the analog signal A, i e. the clock signal contained in the analog signal A. Such a phase detection characteristic is plotted in FIG. 5.

Assume that among the k-bits of output digital signal of the A/D converter 4, the most significant digit (MSD) is the data bit which is representative of a polarity (±) (e.g. a ONE representing the positive polarity and a ZERO the negative polarity). Also, assume that the remaining lower (k−1) digits are representative of a magnitude of the signal. Then, as shown in FIG. 6, the multiplier 7 of FIG. 1 can be implemented with only a simple Exclusive-OR gate 8.

Figure 6:
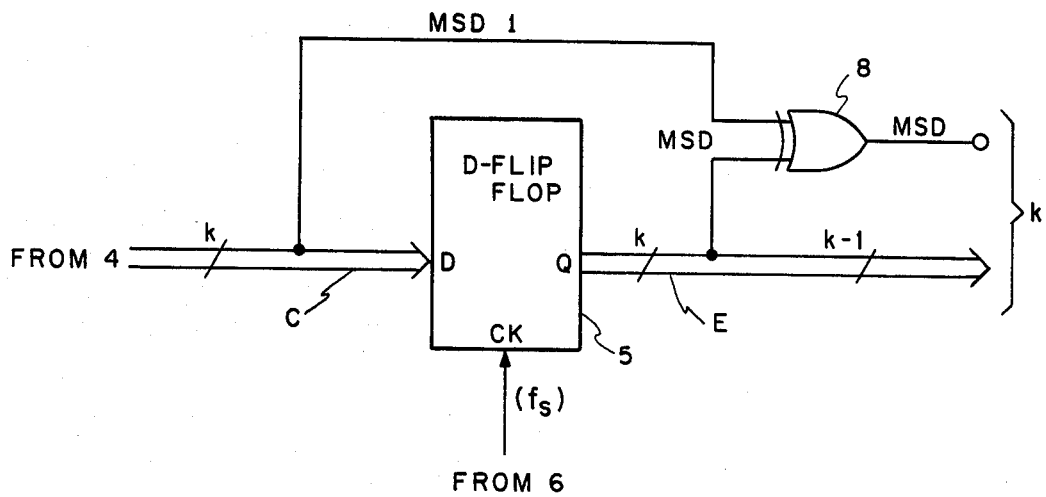
FIG. 6 is a block diagram of another embodiment of the present invention.

Specifically, in FIG. 6, the MSD of the k-bits digital signal C is applied to one input of the Exclusive-OR gate 8, and the MSD of the delayed output E of the D FF 5 to the other input of the gate 8. The phase difference signal F is produced by a combination of the output of the gate 8 and the output E of the D FF 5, except for the MSD, i.e., the remaining lower (k−1) bits. In this condition, the MSD of the k-bits output F of the gate 8 is representative of a polarity of the phase difference data. The remaining lower (k−1) bits are representative of a magnitude of the phase difference.

Describing the principle of this particular construction, the delayed signal E has been sampled by the D FF 5, at the rate fs, to give the odd sampled signal $F_{odd}$ (t) which is represented by the Eq. (2). The lower (k−1) bits of the signal E contain data having a magnitude which corresponds to the phase difference θ=(π/T). This data is to be obtained.

Meanwhile, the MSD of the k-bits digital signal C is representative of the polarity of the analog signal A0 which has appeared at the instant of sampling. Therefore, at the instant when the gate 8 computes Exclusive-OR, the MSD is representative of a polarity (±) of the even sampled signal $F_{even}$ (t) which is produced by the Eq. (1). Because the magnitude of the phase difference θ is determined in terms of the magnitude of the signal $F_{odd}$ (t) and the polarity in terms of the product of MSDs of nearby odd sampled signals, the polarity if attainable in terms of the output of the gate 8.

The fact discussed above will be presented using numerical expressions. A signal produced by determining a polarity of the signal of the Eq. (1) is expressed as $$\text{sgn}\{\cos(n\pi + \pi t0/T)\}$$

The product of this signal and the signal of the Eq. (2) derives an expression $$F = \text{sgn}\{\cos(n\pi + \pi t0/T)\} \times (-1)\sin\{n\pi + (\pi/T)t0\} \qquad \text{Eq. (4)}$$
$$= -\sin(\pi t0/T)$$

Figure 7:
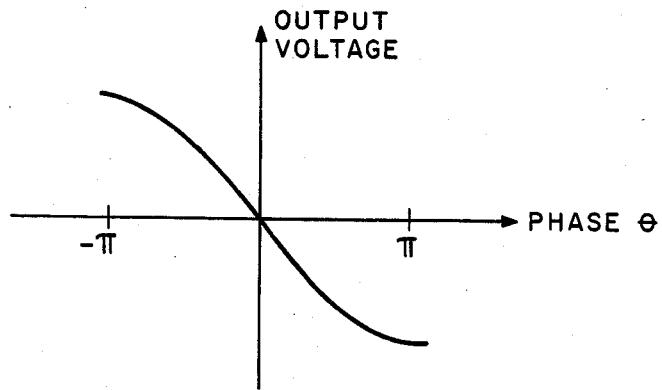
FIG. 7 is a plot showing a phase detection characteristic of the circuit shown in FIG. 6.

The phase detection characteristic of the circuit shown in FIG. 6 is plotted in FIG. 7.

Figure 8:
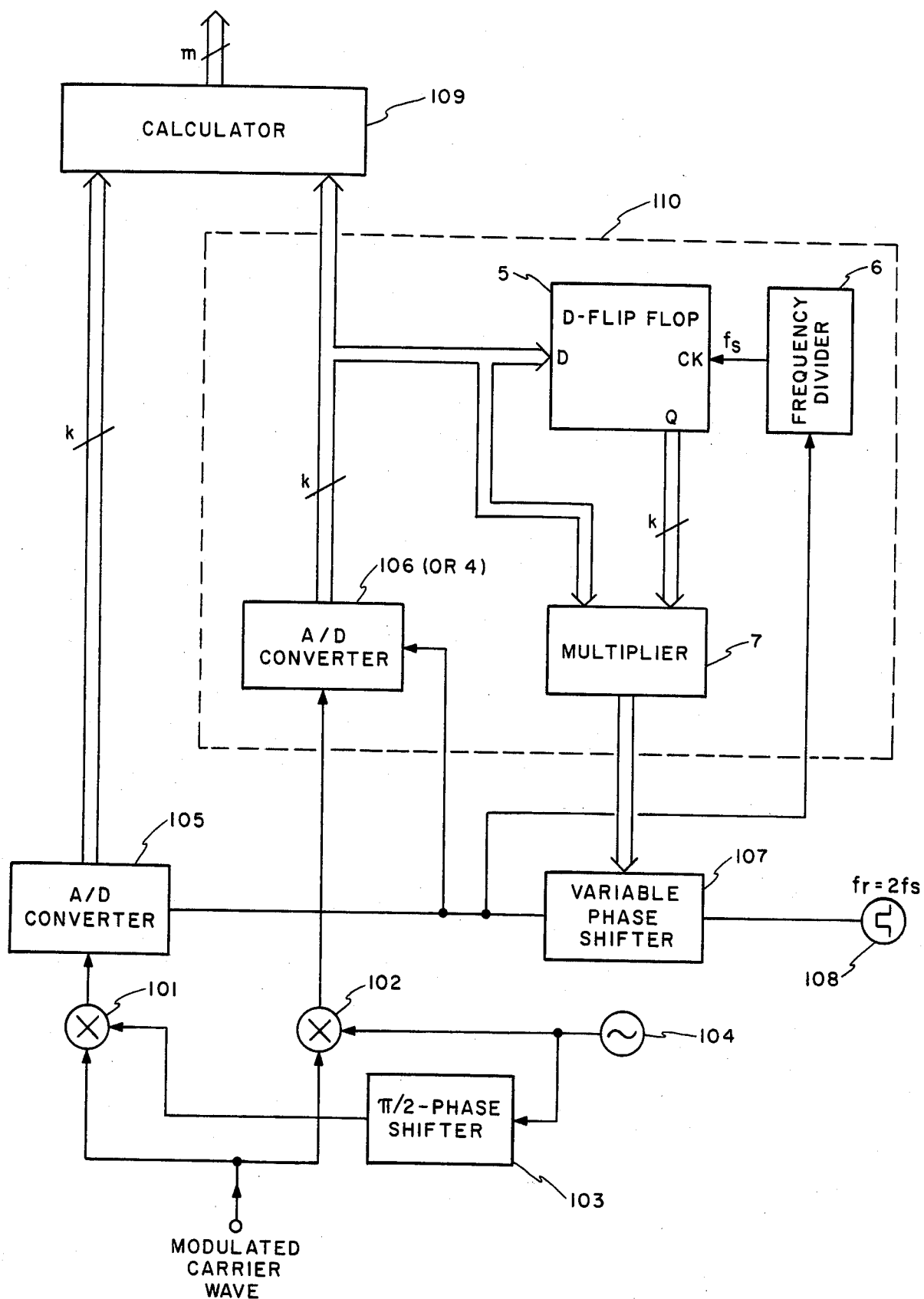
FIG. 8 is a block diagram which is representative of an application of the present invention to a demodulator.

FIG. 8 is a block diagram of the phase detection circuit of FIG. 3, which is applied to a demodulator. As shown, the demodulator includes coherent detectors 101 and 102 to which a modulated carrier wave, such as a PSK wave or a QAM wave is applied. The detectors 101 and 102 detect the input carrier wave responsive to a carrier wave which is the output of a carrier wave generator 104, passed through a π/2 phase shifter 103. Detectors 101 and 102 also respond to the modulated carrier wave which is not passed through the phase shifter 103.

The demodulated analog signal outputs of the detectors 101 and 102, respectively, are applied to A/D converters 105 and 106. Each of these outputs from detectors 101, 102 is converted into k-bits digital signals. The outputs of the A/D converters 105 and 106 are routed to a calculator 109 to be converted to an m-bits recovered digital signal, while being subjected to error correction and other signal processings.

A circuit 110, which is constructed as shown in FIG. 3, is adapted to detect a phase difference between the clock signal fc contained in the output analog signal of the detector 102 and the reference clock signal fr (=2fs), which is received from a reference clock generator 108. The reference clock signal fr is routed through a variable phase shifter 107 to a frequency divider 6 and sampling terminals of the A/D converters 105 and 106. The frequency divider 6 halves the frequency of the clock signal fr.

Each of the converters 105 and 106 converts an analog signal value, at a sampling point, to a k-bits digital signal. The variable phase shifter 107 is controlled by a multiplier 7 of the circuit 110 such that the phase difference between the clock signals fc and fr converges to zero.

In summary, it will be seen that the present invention provides a phase detection circuit which processes a modulated carrier wave by use of a clock signal, having a rate which is double the modulation rate. Therefore, the invention makes it possible to use a low rate clock, as compared to the clock rate required by a prior art circuit, thereby increasing the operation rate of a demodulator.

Those who are skilled in the art will readily perceive how to modify the invention. Therefore, the appended claims are to be construed to cover all equivalent structures which fall within the true scope and spirit of the invention.

What is claimed is:

1. A phase detection circuit for detecting the difference in phase between a reference clock signal and an analog signal including a clock component signal, comprising:
   analog-to-digital converter means for sampling the analog signal at the frequency of the reference clock signal and for providing a k-bit first digital signal;
   delay circuit means responsive to said converter means for sampling the first digital signal at a frequency equal to one-half the frequency of the reference clock signal and for providing a k-bit second digital signal; and
   multiplier means jointly responsive to said converter means and said delay circuit means for multiplying the first digital signal by the second digital signals to provide a data signal which is representative of the phase difference.

2. A phase detection circuit as claimed in claim 1, wherein the delay circuit means comprises a D type flip-flop.

3. A phase detection circuit as claimed in claim 1, wherein the multiplier means comprises an Exclusive-OR gate responsive to the most significant digits of the first and second digital signals; the output of the Exclusive-OR gate and the remaining lower $(k-1)$ digits of the second digital signal constituting the phase difference data signal.

4. A phase detection circuit as claimed in claim 1, further comprising variable phase shifter means responsive to the phase difference data signal for phase-shifting the reference clock signal and for supplying the phase-shifted reference clock signal to the analog-to-digital converter.

5. A phase detection circuit as claimed in claim 4, wherein the analog signal is a signal which is obtained by coherent-detecting a digital modulated carrier wave.

6. A phase detection circuit as claimed in claim 5, wherein the digital-modulated carrier wave is a PSK wave.

7. A phase detection circuit as claimed in claim 5, wherein the digital-modulated carrier wave is a QAM wave.

8. A phase detector comprising analog-to-digital converter means responsive to an analog carrier wave for providing a digital output signal, delay means, two input multiplier means, for applying said digital output signal directly to one input of said multiplier means and through said delay means to the other of said inputs of said multiplier means, and clock means for driving said analog-to-digital converter means and said delay means, said converter means responding to said clock means at a rate which is twice the rate that said delay means responds to said clock means.

9. The detector of claim 8 wherein said delay means is a D flip-flop.

10. The detector of claim 9 and a frequency divider, said clock means being connected directly to said converter means and being connected through said frequency divider to said D flip-flop.

11. The detector of claim 10 wherein said multiplier means comprises a two input Exclusive-OR gate.

12. A demodulator comprising a source of modulated carrier waves, a pair of coherent detector means driven by different phases of an oscillating signal and coupled to respond to said modulated carrier waves, a pair of analog-to-digital converter means individually driven by a corresponding one of said coherent detector means, two input calculator means driven from said pair of converter means, delay means, multiplier means, means responsive to one of said converter means for directly driving said multiplier means and for driving said multiplier via said delay means, means responsive to said multiplier means for controlling said pair of analog-to-digital converter means at a first frequency, and means also responsive to said multiplier means for controlling said delay means at one-half of said frequency.

13. The demodulator of claim 12 and an oscillator means, a variable phase shifter means driven by said oscillator means, and means responsive to the output of said multiplier means for controlling said variable phase shifter.

14. The demodulator or claim 12 and a frequency divider connected between said variable phase shifter means and said delay means.

* * * * *

UNITED STATES PATENT AND TRADEMARK OFFICE
CERTIFICATE OF CORRECTION

PATENT NO. : 4,686,484
DATED : August 11, 1987
INVENTOR(S) : Susumu Otani

It is certified that error appears in the above—identified patent and that said Letters Patent is hereby corrected as shown below:

Col. 6, line 16, "means, for applying" should be --means, means for applying--.

Signed and Sealed this

Seventeenth Day of May, 1988

Attest:

DONALD J. QUIGG

*Attesting Officer*   *Commissioner of Patents and Trademarks*